United States Patent [19]

van Os

[11] 3,972,690
[45] Aug. 3, 1976

[54] GASIFICATION PROCESS

[75] Inventor: George van Os, Amsterdam, Netherlands

[73] Assignee: Shell Oil Company, Houston, Tex.

[22] Filed: Aug. 27, 1975

[21] Appl. No.: 608,133

[30] Foreign Application Priority Data
Sept. 9, 1974  Netherlands .................... 7411916

[52] U.S. Cl. .................... 48/212; 48/95; 48/200; 48/201; 48/215; 239/405; 252/373
[51] Int. Cl.² .................... C01B 2/14; C10G 9/38
[58] Field of Search ............. 48/93, 95, 98, 100, 48/196 R, 197 R, 200, 201, 212, 215; 239/132.3, 403, 405; 110/28 B; 431/158; 252/373

[56] References Cited
UNITED STATES PATENTS

| 1,826,776 | 10/1931 | Gunther | 239/403 |
|---|---|---|---|
| 2,535,730 | 12/1950 | Gadret | 110/28 B |
| 2,904,417 | 9/1959 | Nuyl | 48/212 |
| 2,971,829 | 2/1961 | Rossum et al. | 48/196 R |
| 3,272,441 | 9/1966 | Davis et al. | 239/403 |
| 3,528,930 | 9/1970 | Schlinger et al. | 48/215 |

FOREIGN PATENTS OR APPLICATIONS

| 815,451 | 6/1959 | United Kingdom | 239/132.3 |
|---|---|---|---|
| 1,116,979 | 6/1968 | United Kingdom | |

*Primary Examiner*—S. Leon Bashore
*Assistant Examiner*—Peter F. Kratz

[57] ABSTRACT

A process for the gasification of oil containing finely dispersed solids, e.g., oil from tar sands, by partial combustion in a hollow reactor is disclosed in which process the gaseous oxidant is introduced into the reactor under flow conditions characterized by a relatively large axial velocity component as compared with the tangential flow component resulting in a relatively long flame.

7 Claims, 2 Drawing Figures

GASIFICATION PROCESS

BACKGROUND OF THE INVENTION

In the chemical and energy providing industries there is a great demand for gas containing substantial amounts of hydrogen and/or carbon monoxide in various mixtures and purities. Such gas may be used, for instance, as a starting material for the manufacture of chemical products — e.g., ammonia, alcohols, etc., — as a reducing agent, as a clean fuel or in hydrogenation processes. A well-known and widely employed method for the preparation of such a gas is the partial combustion of hydrocarbonaceous fuels in a substantially void or hollow reactor. One of the attractive aspects of this process is its flexibility in the types of hydrocarbon fuels which can be converted to the desired gaseous products. Suitable hydrocarbonaceous fuels which may be subject to partial combustion in this non-catalytic process include normally gaseous and liquid hydrocarbons, e.g., middle distillates and light and heavy fuel oil, as well as liquid fuels mixed with solid carbon-containing particles such as the carbon soot typically obtained as a product of partial combustion. The combustion can be effected with oxygen, with air, or with air which has been enriched with oxygen. Frequently steam is added to the reaction mixture.

A frequently used hydrocarbonaceous fuel is a residual petroleum fraction which fuel contains ash-forming constituents. However, the percentage of ash is relatively low, i.e., generally not exceeding 0.05% weight, and in the conventional hollow reactors such an ash content presents no difficulties. The ash particles thus formed leave the reactor with the product gases and are separated from the gases by means known in the art, before, after or during cooling of the gases.

However, some hydrocarbonaceous fuels employed contain more than about 0.1%w finely dispersed solids. Liquid petroleum fractions with a far higher content of finely dispersed solids is obtained, for instance, from the mining and processing of tar sands. These tar sand deposits occur in very large deposits at various places on earth and present potentially valuable sources of petroleum. Dependent on the process employed to extract the petroleum from the tar sands, liquid petroleum fractions are obtained with a solids content varying typically from about 0.5 to about 5.0% weight. These solids consist mainly of sand and clay particles.

Another source of high solid content hydrocarbonaceous fuel employed in partial combustion processes is a liquid petroleum fraction containing a dispersion of coal, soot or coke. The coal may be hard coal, such as anthracite, or bituminous coal, brown coal or lignite. Such dispersions of solid particles in liquid petroleum fractions are useful fuels in partial combustion processes because it is a convenient means of pressurizing solid fuel in a reactor in order to gasify the solid and liquid fuel. The solid particles, in particular the various type of coal, typically contain ash-forming constituents.

It has now been found that employing such liquid petroluem fractions containing finely dispersed solids as feed to a partial combustion process results in the formation of deposits in the reactor, in particular on the wall opposite the fuel inlet, and in such amounts that normal operation must regularly be interrupted for removing such deposits from the reactor walls.

CONVENTIONAL OPERATION

In a typical partial combustion reactor, the oxidant-air, oxygen or a mixture of the two are introduced into the reaction chamber in such a fashion that the oxidizing gas is rotated tangentially around the injected finely dispersed fuel in order to promote the stability of the flare. See, for example, British Pat. No. 1,116,979. Further, the oxidant is given this strong rotary motion because this also promotes swirling of the reaction mixture in the reactor and consequently improves the mixing of fuel and oxidant. A result of this strong swirling action in the reactor is that the solid particles in the feed are flung against the wall of the reactor. As long as these particles are hard and non-sticky, there is little problem of deposits and accumulation. In the case of solids that are molten under the prevailing reaction conditions, there is, as a rule, also no accumulation problem, at least not for the side and top walls of the reactor, because the molten substance is fairly thin-flowing and tends to flow down the walls of the reactor. However, when non-combusted or only partly combusted oil is present in the reaction chamber, the oil acts as an adhesive, as a result of which a sticky substance with a high solids content can be deposited on the reactor wall. Although, due to the high temperature in the reactor, the hydrocarbons in the deposits are cracked and carbonized, the deposits remain on the reactor walls. Accordingly, not only ash-forming particles, such as clay, sand, etc., adhere to the reactor walls, but if the fuel contains a dispersion of coal in oil, the deposits also contain coal particles that have not yet been combusted.

Under conventional process conditions with a strong swirl, the reaction mixture in the reactor has an outward swirl in which a relatively large amount of partly combusted oil is still present, especially in the middle and upper part of the reactor where deposits can be formed. One measure in the degree of swirl within the reactor is the ratio of the axial velocity component ($V_{ax}$) of the oxidant as compared to the tangential velocity compounds ($V_{tan}$) of the oxidant as measured at the outlet of the injection device. In conventional processes the ratio of $V_{ax}$ to $V_{tan}$ is typically less than 2, resulting in such a degree of outward swirl of the reaction mixture in the reactor as to create deposits on the reactor walls.

SUMMARY OF THE INVENTION

The present invention is an improvement in the process for the partial combustion of a liquid hydrocarbon fuel containing finely dispersed solids in a substantially void reactor wherein the fuel is mixed with or finely dispersed in an oxygen-containing gas and passed as a solid-containing gaseous jet through at least one supply opening in the reactor and wherein the oxygen-containing gas is introduced into the reactor with an axial as well as tangential velocity component so as to impart a swirl to the flame, which improvement comprises maintaining the ratio of the axial velocity component ($V_{ax}$) of the oxygen-containing gas as compared to the tangential velocity component ($V_{tan}$) of the oxygen-containing gas in excess of 3.0, preferably 4 to 5.

By maintaining this relatively high ratio of $V_{ax}$ to $V_{tan}$, the outward swirl of the fuel-oxygen mixture is greatly reduced resulting in a longer residence time for the fuel particles in the body of hot gas. In addition, the chances of contact of the uncombusted fuel with the reactor wall is decreased and the time available for oxidation has increased such that no adhesive substance is present to cause solid particles to adhere to the wall.

Also disclosed is an apparatus suitable for carrying out the process according to the invention. The apparatus comprises a substantially void reactor having an inlet device with a central tube for the supply of the fuel surrounded by an inlet channel for the oxidant, the center line of the tube and the channel coinciding with the center line of the reactor, the inlet channel being provided with a tangentially directed supply tube for the oxidant, while the ratio of the diameter of the channel for the oxidant to the diameter of the output opening of that channel is at least 3. Thus, the oxidant is forced to flow through a relatively more narrow opening than found in conventional design whereby the axial component of the velocity is increased.

THE DRAWINGS

The invention is described in greater detail with reference to the accompanying drawings. These drawings which illustrate the process and apparatus of the present invention are intended to be illustrative rather than limiting on its scope.

DETAILED DESCRIPTION OF THE INVENTION

Figure 1:
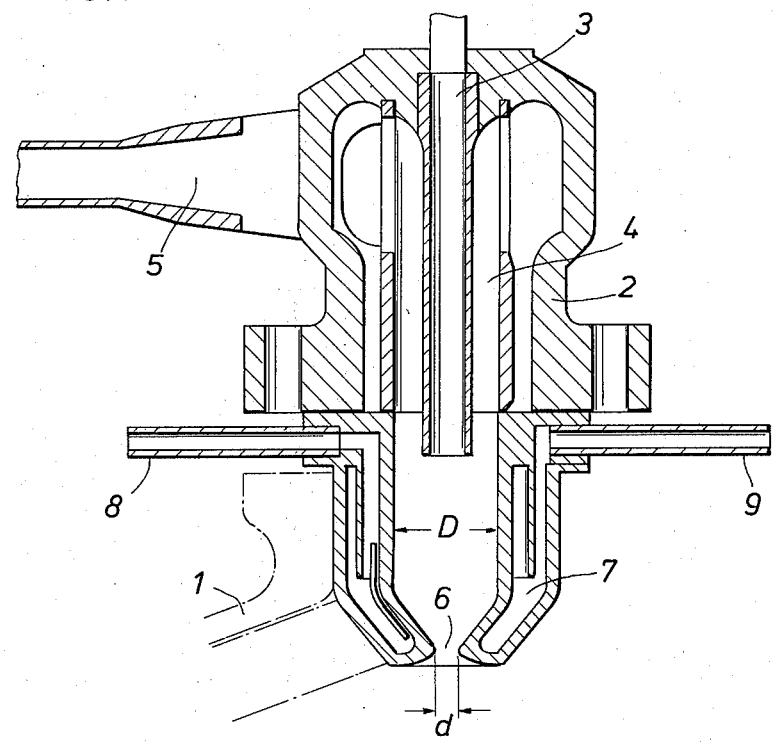
FIG. 1 is a longitudinal section of an apparatus according to the invention.

The partial combustion step of the present invention can be suitably carried out using air, oxygen-enriched air or oxygen as the oxidant source (oxygen-containing gas). In any case, it is contemplated that the reaction will be conducted under conditions of temperature and pressure such that the reaction is self-supporting. Accordingly, the reaction temperature, broadly stated, is from about 700° to about 2000°C with a reaction pressure of from atmospheric to about 600 psig. Within the broad range the reaction temperature and pressure are preferably 900°–1400°C and atmospheric to 30 psig, respectively, when air is used as the oxidant source with somewhat higher temperatures and pressures, e.g., 1100°–1700°C and atmospheric to 600 psig, being employed when oxygen is used as the source of oxygen-containing gas.

The hydrocarbonaceous fuels which are suitable for use in the process of the invention include any liquid hydrocarbon feed material containing finely dispersed solids, preferably greater than about 0.1% finely dispersed solids. Examples of suitable hydrocarbonaceous fuels include those mentioned in the section of the specification entitled Background of the Invention. Examples of liquid hydrocarbon or petroleum fractions include gasoline, kerosene, naphtha, distillates, gas oils and residual oils. A particularly preferred feed to be employed in the present invention is the petroleum fraction obtained from the processing of tar sands.

The O/C ratio (oxygen to carbon) of the total oxygen-containing gas and hydrocarbonaceous fuel feedstock introduced into the partial combustion reaction zone may suitably vary between about 0.8 and about 2.0 with ratios in the range of 0.8 to about 1.2 being preferred.

Certain benefits, such as reduced soot make, are also realized in the process when steam is introduced into the reactor with either or both of the hydrocarbon fuel and/or oxygen-containing gas feedstock to the partial combustion reactor. Thus, in an optional embodiment of the invention, the oxygen-containing gas, the hydrocarbonaceous fuel or the oxygen-containing gas/hydrocarbonaceous fuel admixture may be mixed with steam or passage into the partial combustion reactor. Additionally, either or both of the hydrocarbonaceous fuel and oxygen-containing gas feedstreams may be subject to preheating via external heat exchange prior to introduction into the partial combustion reactor.

The apparatus suitable for carrying out the process according to the invention comprises a substantially void reactor having an inlet device with a central tube for the supply of the fuel surrounded by an inlet channel for the oxygen-containing gas, the center lines of the tube and the channel coinciding with the center line of the reactor, the inlet channel being provided with a tangentially directed supply tube for the oxygen-containing gas, while the ratio of the diameter of the channel for the oxidant to the diameter of the outlet opening of that channel is at least 3.

If desired, it is possible to adapt an inlet device of current dimensions suitable for the gasification of oil to the gasification of liquid hydrocarbons containing finely dispersed solids. This may be done by applying a thin coating of a suitable metal, e.g., steel, to the inside of the channel for the oxidant near the outlet opening.

According to the present invention, a reactor with a conventional length to width ratio of about 2 to 3 gives excellent performance. If desired, a reactor with a larger length to width ratio may be employed and be adapted to the length of the flame.

If only one supply device is present, the center line of it preferably coincides with the center line of the reactor. If a plurality of supply devices are present, they are preferably arranged in a regular array relative to the center line of the reactor, the distance between any two supply devices being at least 10 times as large as the diameter of the outlet of the supply device and the diameter of the reactor being so large that the distance between the wall of the reactor and the nearest supply device is at least five times as large the diameter of the outlet of the supply device.

The invention is further illustrated by means of reference to the figures and an illustrative embodiment. Note that the figures and illustrative embodiment are given for the purpose of illustration only and that the invention is not to be regarded as limited to any of the specific conditions or reactants recited therein.

DETAILED DESCRIPTION OF THE DRAWINGS

Referring to FIG. 1, only a small portion of the reactor wall, indicated by 1, is shown. The inlet device 2 contains a central pipe or tube 3 for supply of the liquid hydrocarbon feed which liquid feed contains finely dispersed solids. This central tube 3 is surrounded by a channel 4 for the oxygen-containing gas, which gas may or may not be mixed with steam. The channel 4 is connected to a tangentially directed oxidant supply tube 5 such that the oxidant from supply tube 5 rotates around fuel tube 3 in the direction of outlet 6. The ratio of the diameter D of channel 4 to diameter $d$ of outlet 6 is significant since as this ratio is increased, the gaseous oxidant-fuel mixture will enter the reaction chamber with a larger axial component of the velocity. A typical ratio of D to $d$ according to the present invention is about 4.5 as compared to a value of less than about 3 for a conventional design. The inlet device is furthermore provided with a water jacket 7 having an inlet 8 and outlet 9 for the circulating cooling water.

Figure 2:
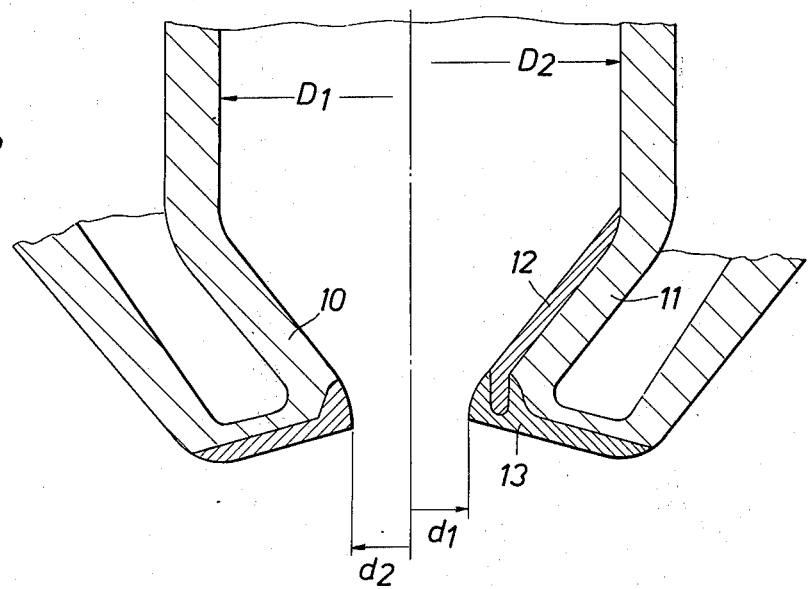
FIG. 2 shows in more detail a longitudinal section in which such an apparatus is compared with an apparatus according to prior art.

FIG. 2 indicates how a conventional inlet device may be adapted for use in the present invention. The lefthand side of FIG. 2 shows a conventional inlet device whereas the righthand side shows a conventional inlet device modified for use in the present invention. $D_1$, $D_2$, $d_1$ and $d_2$ denote the diameters in accordance with D and d of FIG. 1. Parts 10 and 11 have the same dimensions and diameter $D_1$ equals diameter $D_2$. It has been shown in FIG. 2 that by applying a coating 12 of a suitable steel and by a minor modification of the lining 13 of the nozzle of the inlet device, that diameter $d_2$ has been made smaller than diameter $d_1$ and consequently $D_2/d_2 < D_1/d_1$.

ILLUSTRATIVE EMBODIMENT I

A series of runs were carried out in a semi-commercial installation, each with a running time of between 18 and 24 hours. The runs were carried out with a heavy oil originating from a tar sand deposit. In runs 1–5, the oil had an ash content of 0.64%w while in run 6 the ash content was 2.1%w. Gasification was conducted with air preheated to 400°–500°C and feed preheated to 160°–170°C. The pressure in the reactor was 16–17 bar. The results of the run, including the additional process conditions are given below in Table I. $V_{ax}$ and $V_{tan}$ are the velocity components of the air alone as measured at the outlet of the supply device (comparable to opening 6 of FIG. 1). "Ash retention" is the difference between the amount of ash introduced into the reactor with the fuel and the amount of ash leaving the reactor with the gas, expressed as a percentage of the ash present in the feed. After run 3, a 25 mm thick layer of porous ash was found to be adhering to the top and to the side wall down to about the middle of the reactor. The temperature in the reactor was invariably lower than the melting point of the ash present in the feed (about 1320°C).

Table I

| Run No. | Feed kg/h | Oxygen Nm³/kg feed | Steam kg/kg feed | Temp. °C | Ash supply kg/h | $V_{ax}/V_{tan}$ | Ash retention % |
|---|---|---|---|---|---|---|---|
| 1 | 174 | 0.85 | 0.50 | 1260 | 1.11 | 1.9 | 42 |
| 2 | 171 | 0.85 | 1.49 | 1173 | 1.09 | 1.9 | 36 |
| 3 | 146 | 0.95 | 0.00 | 1179 | 0.93 | 1.9 | 92 |
| 4 | 163 | 0.69 | 1.03 | 1177 | 1.04 | 4.3 | 7 |
| 5 | 159 | 0.70 | 0.48 | 1225 | 1.02 | 4.3 | 13 |
| 6 | 167 | 0.63 | 0.91 | 1290 | 3.52 | 4.3 | 0 |

What is claimed is:

1. In the process for the partial combustion of a liquid hydrocarbon fuel containing finely dispersed solids in a substantially void reactor wherein the fuel is mixed with or finely dispersed in an oxygen-containing gas and passed as a gaseous jet through at least one supply opening in the reactor and wherein said oxygen-containing gas is introduced into said reactor with a tangential as well as axial velocity component, the improvement wherein the ratio of the axial velocity component ($V_{ax}$) of the oxygen-containing gas as compared to the tangential velocity component ($V_{tan}$) of the oxygen-containing gas exceeds 3.0.

2. A process according to claim 1 wherein the weight percent of finely dispersed solids in said liquid hydrocarbon fuel exceeds 0.1%.

3. A process according to claim 2 wherein said liquid hydrocarbon fuel is a petroleum fraction obtained from the processing of tar sands.

4. A process according to claim 3 wherein the weight percent of finely dispersed solids in said liquid hydrocarbon fuel is between about 0.5 and 5.0% weight.

5. A process according to claim 4 wherein the ratio of $V_{ax}$ to $V_{tan}$ is between about 4.0 and about 5.0.

6. A process according to claim 1 wherein the ratio of $V_{ax}$ to $V_{tan}$ is between about 4.0 and about 5.0.

7. A process according to claim 1 wherein steam is injected into said reactor.

* * * * *